Nov. 8, 1955  J. W. GARRISON ET AL  2,723,351
THICKNESS MEASUREMENT
Filed Dec. 4, 1952
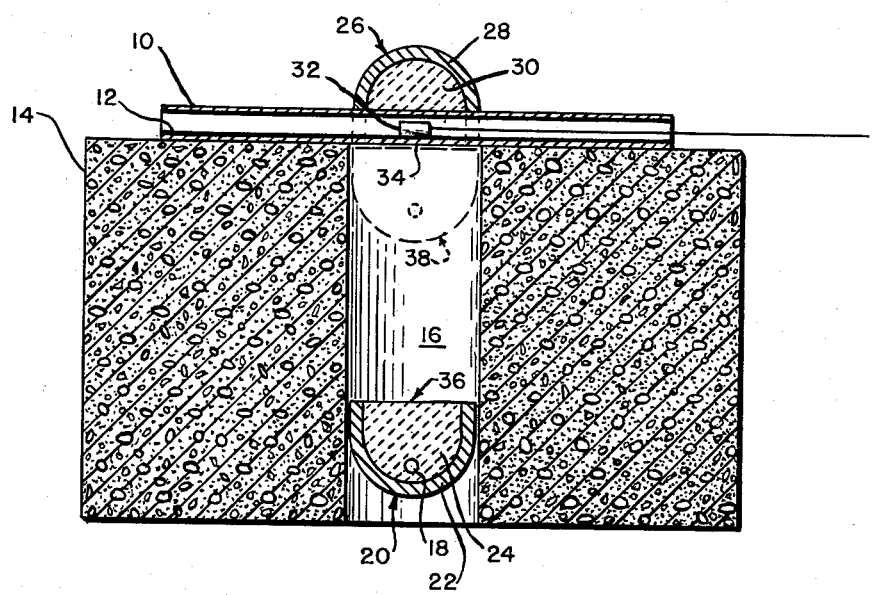
INVENTORS,
JACK W. GARRISON
RICHARD F. HUMPHREYS
BY
Harry M. Saragovitz
Attorney 2,723,351
Patented Nov. 8, 1955

2,723,351

THICKNESS MEASUREMENT

Jack W. Garrison and Richard F. Humphreys, Chicago, Ill., assignors to the United States of America as represented by the Secretary of the Army Application December 4, 1952, Serial No. 324,036

3 Claims. (Cl. 250—83.6)

This invention relates to a method for the measurement of the thickness of metal coatings and more particularly to a method and apparatus for measuring the thickness of the silver coating on the internal surface of waveguides using the principle of radioactivity.

Radiological methods have been applied in various ways such as in the use of beta ray thickness gauges, in the use of radioactive isotopes for tracer purposes, and in many other situations.

It is well known in the art that certain metals, when subjected to the bombardment of thermal neutrons will undergo a change in atomic structure thereby being converted to a radioactive isotopic form with an accompanying emission of beta particles. If the half-life of the radioactive isotope of such a metal resulting from thermal neutron bombardment is of reasonably short duration, the optimum period being a few minutes, this radioactive property may be utilized to measure the thickness of a coating of such a metal.

A method of measuring the hydrogen content in a substance is disclosed in Patent No. 2,476,810 granted to E. M. Brunner et al. on July 19, 1949. In that patent, the hydrogen containing substance is utilized to convert fast neutrons into thermal neutrons and the latter are caused to irradiate a metal capable of undergoing isotopic change with resulting beta particle emission. However, this method is not sufficiently accurate for use in measuring the thickness of delicate metal surfaces.

It is, therefore, an object of the present invention to provide a method for determining the thickness of metal surfaces utilizing the principle of radioactivity.

It is a further object to provide an efficient method for determining the thickness of the silver coating on the internal surface of a waveguide.

It is another object to provide an apparatus for measuring the thickness of the silver coating on the internal surface of a waveguide.

In accordance with the present invention, there is provided a method for determining the thickness of prescribed metal coatings which are activated to beta particle emitting isotopes when subjected to the radiation of thermal neutrons. This method comprises subjecting the metal coating whose thickness is to be measured to the radiation of thermal neutrons for a predetermined period thereby activating the metal to a radioactive isotopic form. The neutron irradiation is then discontinued and the metal is permitted to become deactivated with an accompanying emission of beta particles. The amount of beta particles emitted is recorded for a predetermined period during deactivation.

Also, in accordance with the present invention, there is provided an apparatus for determining the thickness of the silver coating on the internal surface of a waveguide comprising a neutron source. Means comprising a lead reflector containing paraffin therein is provided for converting the neutrons from this source to thermal neutrons for irradiating the coating whereby the silver is converted to beta particle emitting isotopic forms. Means are provided to position the waveguide over a shaft for retaining the neutron source at varying distances from the waveguide. The waveguide is covered with a paraffin containing lead cap provided with a channel therein to receive the waveguide and means are provided for recording the number of beta particles emitted from the silver internal surface upon its irradiation with thermal neutrons. Preferably, the counting of the emitted beta particles takes place after the irriation has been discontinued.

For a better understanding of the invention, together with other and further objects thereof, reference is had to the following description taken in connection with the accompanying drawings and its scope will be pointed out in the appended claims.

In the drawing, there is shown in vertical section, a waveguide 10 having its internal surface 12 coated with a suitable metal such as silver. Waveguide 10 is supported by means of a concrete table 14 which is provided with a centrally disposed vertical shaft 16 wherein neutron source 18 is retained and may be moved varying distances from waveguide 10. Neutron source 18 is contained in receptacle 20 which comprises a lead "reflector" cap 22 filled with paraffin 24 wherein the neutron source is imbedded. Waveguide 10 is covered by cap 26 which comprises a lead sheath 28 containing paraffin 30. Beta ray counter 32 which may be a G. M. (Geiger-Muller) counter or other suitable beta ray counting means is inserted into waveguide 10.

In operation, waveguide 10 is covered with lead sheathed paraffin cap 26. It is then placed on table 14 over aperture 34 in shaft 16 which retains neutron source 18. Neutron source 18 is rapidly raised from storage position 36 into irradiation position 38 and the time of irradiation of waveguide 10 is begun. Since neutrons from neutron source 18 are converted to thermal neutrons upon passage through paraffin 24 in receptacle 20, waveguide 10 is thereby irradiated with thermal neutrons. The irradiation is continued 2 to 5 minutes, the preferable period being about 150 seconds, at which time neutron source 18 is lowered to storage position 36 to stop the irradiation. Emitted beta particle counts are thereafter recorded for a decay period of 2 to 5 minutes, 150 seconds being the preferable duration of the count. Beta particle counts from the background and the brass waveguide outer surface are subtracted from the total count to give the silver count which may be suitably converted into thickness values by well known means.

The above operation depends upon the fact that silver when bombarded with thermal neutrons changes into beta particle emitting isotopes of relatively short half-life. To determine the feasibility of measuring the thickness of a silver film (from 0.00254 cm. to 0.00025 cm.) on brass 0.127 cm. thick, certain preliminary calculations had to be made. An accuracy of 10% was sought and the factors considered in the calculations consisted of the following facts that: the waveguide is 1 cm. x 2.25 cm. internal dimensions, the measurement was to be made over a 1 cm. circle, measurements of areas in radii and twists would be necessary, and the measurement would have to be non-destructive. Also, since the body of the waveguide is made of brass, the effect of beta particle emission by copper and zinc would have to be taken into consideration in the final beta particle count.

Although silver isotopes produced by thermal neutron irradiation are beta particle emitters of relatively short half-life, copper and zinc on the other hand, when bombarded with thermal neutrons produce longer half-lived beta particle emitters with the exception of one copper isotope of 32% abundance. By bombarding the waveguide with thermal neutrons for a short time, a much larger portion of the silver than the brass is activated and the resulting activation can be measured with a G. M. counter. The G. M. counter is known to be relatively insensitive to neutrons and gamma radiation.

It was found that it is necessary to place the G. M. counter inside the waveguide because of the very large absorption coefficient of brass for electrons. The maximum range of the 2.8 m. e. v. electrons emerging from the silver layer is 1.47 grams per square centimeter. This means that all the beta particles will be stopped in a material that weighs 1.47 grams per square centimeter. For brass weighing 8.6 grams per cubic centimeter, this would correspond to a thickness of 0.171 cm. If the G. M. counter is placed outside the waveguide, the waveguide material being about 0.127 cm. thick, or about 75% of the maximum range of the beta particle, the number of emergizing beta particles from the silver is reduced to the near vanishing point since the relative intensity is reduced approximately exponentially with thickness whereas the contribution from the surface layers of brass is relatively great.

By inserting the G. M. counter inside the waveguide, a relatively acurate count of beta particles being emitted from the irradiated coating of silver can be achieved. It is only necessary to calculate the error introduced by any beta particle emission from the brass and subtract that amount from the final registered count.

While there has been described what is at present considered to be a preferred embodiment of the invention, it will be obvious to those skilled in the art that various changes and modifications may be made therein without departing from the invention and it is, therefore, aimed in the appended claims to cover all such changes and modifications as fall within the true spirit and scope of the invention.

What is claimed is:

1. In the method for determining the thickness of prescribed metal coatings wherein said metals are activated to beta particle emitting isotopes when subjected to the radiation of thermal neutrons, the steps comprising subjecting said metal coatings to the radiation of said thermal neutrons for a predetermined period thereby activating said metals to isotopic forms, discontinuing said neutron radiation to permit said metal coating to become deactivated with an accompanying emission of beta particles, and recording the number of said beta particles emitted by said metal coatings for a predetermined period during said deactivation.

2. A method for determining the thickness of a metal coating, said metal being capable of undergoing atomic structure change under the impact of thermal neutrons thereby being activated to a beta particle emitting isotopic form comprising subjecting a prescribed area of said metal coating to the radiation of thermal neutrons for a predetermined period to activate said metal to an isotopic form, discontinuing said neutron radiation to permit said metal coating to become deactivated with an accompanying emission of beta particles and recording the number of said beta particles emitted by said metal coating for predetermined period during said deactivation.

3. A method for determining the thickness of a silver coating on the inner surface of a wave guide comprising subjecting a prescribed area of said coating to the radiation of thermal neutrons from 2 to 5 minutes, thereby activating said silver to beta particle emitting isotopic forms, discontinuing said neutron radiation to permit said silver coating to become deactivated with an accompanying emission of beta particles, and recording the number of said beta particles emitted by said silver coating for 2 to 5 minutes during said deactivation.

References Cited in the file of this patent

UNITED STATES PATENTS

| Number | Name | Date |
|---|---|---|
| 2,476,810 | Brunner et al. | July 19, 1949 |
| 2,508,772 | Pontecorvo | May 23, 1950 |
| 2,640,788 | Rockett, Jr. | June 2, 1953 |
| 2,642,537 | Carroll | June 16, 1953 |